US008024408B1

(12) United States Patent
Wang Baldonado et al.

(10) Patent No.: US 8,024,408 B1
(45) Date of Patent: Sep. 20, 2011

(54) SYSTEM AND METHOD FOR MANAGING A COMPUTER-MEDIATED DISCUSSION FORUM

(75) Inventors: Michelle Q. Wang Baldonado, Palo Alto, CA (US); Bay-Wei W. Chang, Foster City, CA (US)

(73) Assignee: Xerox Corporation, Norwalk, CT (US)

( * ) Notice: Subject to any disclaimer, the term of this patent is extended or adjusted under 35 U.S.C. 154(b) by 1175 days.

(21) Appl. No.: 09/717,303

(22) Filed: Nov. 22, 2000

(51) Int. Cl.
*G06F 15/16* (2006.01)
(52) U.S. Cl. ......... 709/206; 709/203; 709/204; 709/207
(58) Field of Classification Search .................. 709/204, 709/203, 206, 207, 205
See application file for complete search history.

(56) References Cited

U.S. PATENT DOCUMENTS

| | | | |
|---|---|---|---|
| 6,480,885 B1 * | 11/2002 | Olivier ........................... | 709/207 |
| 6,606,644 B1 * | 8/2003 | Ford et al. ...................... | 709/203 |
| 6,630,944 B1 | 10/2003 | Kakuta et al. | |
| 6,651,086 B1 * | 11/2003 | Manber et al. ................. | 709/205 |
| 6,778,982 B1 * | 8/2004 | Knight et al. .................... | 707/3 |
| 2002/0032735 A1 * | 3/2002 | Burnstein et al. ............. | 709/204 |
| 2002/0059164 A1 * | 5/2002 | Shtivelman ...................... | 707/1 |

FOREIGN PATENT DOCUMENTS

| | | |
|---|---|---|
| GB | 2 324 627 A | 10/1998 |
| JP | 09-106331 | 4/1997 |
| JP | 10-303892 | 11/1998 |
| WO | WO 97/27534 | 7/1997 |

OTHER PUBLICATIONS

Laurence Brothers et al., *Supporting Informal Communication Via Ephemeral Interest Groups*, pp. 84-90, CSCW 92 Proceedings, Nov. 1992.
http://www.takeitoffline.com, *QuickTopic*[SM], p. 1 of 1, Nov. 21, 2000.

* cited by examiner

*Primary Examiner* — Djenane M Bayard
(74) *Attorney, Agent, or Firm* — Patrick J. S. Inouye; Krista A. Wittman

(57) ABSTRACT

A forum monitoring device allows an agent to monitor the traffic in a computer-mediated discussion. When the agent determines that there is a significant degree of traffic on a particular topic, or other predetermined rules are satisfied, the agent proposes to the contributors of messages on that topic that a new discussion forum, for example, a new discussion list, be created. If any of the contributors agrees to this suggestion, a new discussion forum, or child forum, is created by the agent. The agent and the contributors are then automatically subscribed to the child forum, and an invitation to join the new forum is sent optionally to the full membership of the parent forum plus any other recipients of postings on the topic.

25 Claims, 2 Drawing Sheets

SYSTEM AND METHOD FOR MANAGING A COMPUTER-MEDIATED DISCUSSION FORUM

BACKGROUND OF THE INVENTION

1. Field of the Invention

This invention relates to discussion fora. In particular, this invention relates to systems and methods for managing electronic messages within a discussion forum.

2. Description of Related Art

Fora provide environments for discussion by a community. In general, forum members supply information, such as, by posting or uploading of electronic messages, to a predetermined location. This information is then available to the remaining forum members for reading, comments, copying, transmission, or the like. Furthermore, a forum allows for subscribers to subscribe to the forum. For example, a subscriber can join a forum and be updated as new information is provided or posted to the forum.

SUMMARY OF THE INVENTION

While the above-identified systems generally work well, not all members of the community are equally interested in all messages that are posted to a forum. Accordingly, readers of these fora, which, for example, are composed of numerous e-mails or postings, typically have to sort through unwanted messages, for example, by writing filters, deleting messages, or the like. Recognition of the time and cost involved in processing unwanted messages in a forum can affect the actions of the other members in the forum community. Specifically, members of the community, for example content contributors, or posters, who place information, such as electronic messages, within the forum may be hesitant to follow up on a posted topic of interest out of concern over increasing traffic within the forum. Thus, in any large forum, there are likely to be topics of interest to a subgroup that do not get addressed, and a myriad of topics that are only of interest to a small subgroup, but nevertheless are posted for the entire community to review.

The systems and methods of this invention provide a solution to the above. In particular, with the present invention in embodiments thereof an agent monitors the traffic in a computer-mediated discussion or forum. When the agent determines that there is a significant degree of traffic on a particular topic, the agent proposes to the contributors of messages on that topic that a new discussion forum be created. If any of the contributors agrees to the suggestion, a new discussion forum is created by the agent. The agent and the contributors are then automatically subscribed to the new forum, and an invitation to join the new forum can be optionally delivered to all or a portion of the full membership of the original forum, plus any other recipients of postings on the topic.

Aspects of the present invention relate to an information stream monitoring system comprising an information monitoring device that monitors one or more electronic documents in an information stream. The information monitoring device also compares information about the one or more electronic documents to at least one rule. A forum spawning device queries a set of users when at least one of the at least one rules is satisfied, and creates a forum based on one or more replies from the set of users.

Aspects of the present invention also relate to an information stream monitoring method comprising monitoring one or more electronic documents in an information stream. Next, information about the one or more electronic documents is compared to at least one rule. A set of users is then queried when at least one of the at least one rules is satisfied and a new forum created based on one or more replies from the set of users.

Aspects of the present invention also relate to information that monitors one or more electronic documents in an information stream. Including, information that compares information about the one or more electronic documents to at least one rule, information that queries a set of users when at least one of the at least one rules is satisfied; and information that creates a new forum based on replies from the set of users.

Aspects of the present invention also relate to an information monitoring system comprising an information monitoring device for monitoring data associated with electronic documents. The information monitoring device is adapted to compare the data from the electronic 0ocuments according to a rule. A forum spawning device queries a set of users when the rule is satisfied, and creates a forum based on a reply from the set of users.

The exemplary forum monitoring system and method of this invention uses a combination of rules and tracking to monitor discussions within a forum, and then subsequently suggest and establish a new forum based on demand.

Specifically, the exemplary system and method of this invention monitor one or more information streams until satisfaction of one or more rules is obtained. Upon satisfaction of one or more rules, the system and method notify a predetermined group of recipients that a rule has been satisfied and requests authorization from the predetermined group of recipients to create a new forum. Upon an indication from one or more of the predetermined group of recipients that a new forum is desired, the systems and methods of this invention establish a new forum and optionally notify the participating users that the new forum as been established.

Additionally, the systems and methods of this invention can be used in conjunction with co-pending Ser. No. 09/717,278 entitled "Systems and Methods For Performing Sender-Independent Managing of Electronic Documents" and Ser. No. 09/717,298 entitled "Systems and Methods for the Discovery and Presentation of Electronic Messages that are Related to an Electronic Message," filed herewith and incorporated herein by reference in their entirety.

These and other features and advantages of this invention are described in or are apparent from the following detailed description of the embodiments of the present invention.

BRIEF DESCRIPTION OF THE DRAWINGS

The embodiments of the invention will be described in detail, with reference to the following figures wherein.

DETAILED DESCRIPTION OF THE INVENTION

By monitoring traffic in an information stream, the systems and methods of this invention can determine when traffic on a particular topic has reached a threshold. Upon meeting the threshold criteria, the systems and methods of this invention propose to the contributors of that topic, for example, through a user interface, that a new discussion forum be created. Upon confirmation that one or more of the contributors desires a new discussion forum, the systems and methods of this invention create the new discussion forum and automatically subscribe the list of contributors to the new discussion forum.

In particular, the systems and methods of this invention perform a number of functions for monitoring and managing an information stream. Thus, for example, the systems and methods of this invention identify when a new forum might be of value. Specifically, an agent subscribes to one or more discussion fora, or information streams, as a member in order to receive the information within that forum. The agent monitors the traffic in that forum in order to determine opportunities for creating a new discussion fora. Upon satisfaction of one or more criteria, or rules, a suggestion for a new forum is sent to the users participating in the identified information stream. Specifically, the agent automatically generates a name for the new forum, based on, for example, the subject matter of the information exchanged on the topic triggering the suggesting of a new forum, and then sends a suggestion message to all users who participated in the discussion on that particular identified topic querying whether they would like to create a new discussion forum for that topic.

If any one or more of the topic contributors agrees that a new discussion forum should be created for that topic, a new forum is created. Once the forum has been created, topic contributors can be automatically added as forum members to the new forum. Furthermore, the other members of the parent, or original, discussion forum can optionally be invited to also participate and/or join the new forum. Since some of the members of the newly created forum may not wish to immediately participate fully in the new forum, the discussion and transactions within the new forum can be automatically archived so that non-members may periodically review discussions within the new, or child, forum.

If an invited user, or any other user, decides to join the new forum, the user has the option of receiving a digest containing all or a portion of the messages posted to the new forum. Furthermore, periodic reports can also be sent to the parent forum to provide status information linked to the activity on the child fora that have been spawned from the parent discussion forum. The report generation can be determined and sent, for example, at regular intervals, or when, for example, traffic on the child forum is high, or the like.

Figure 1:
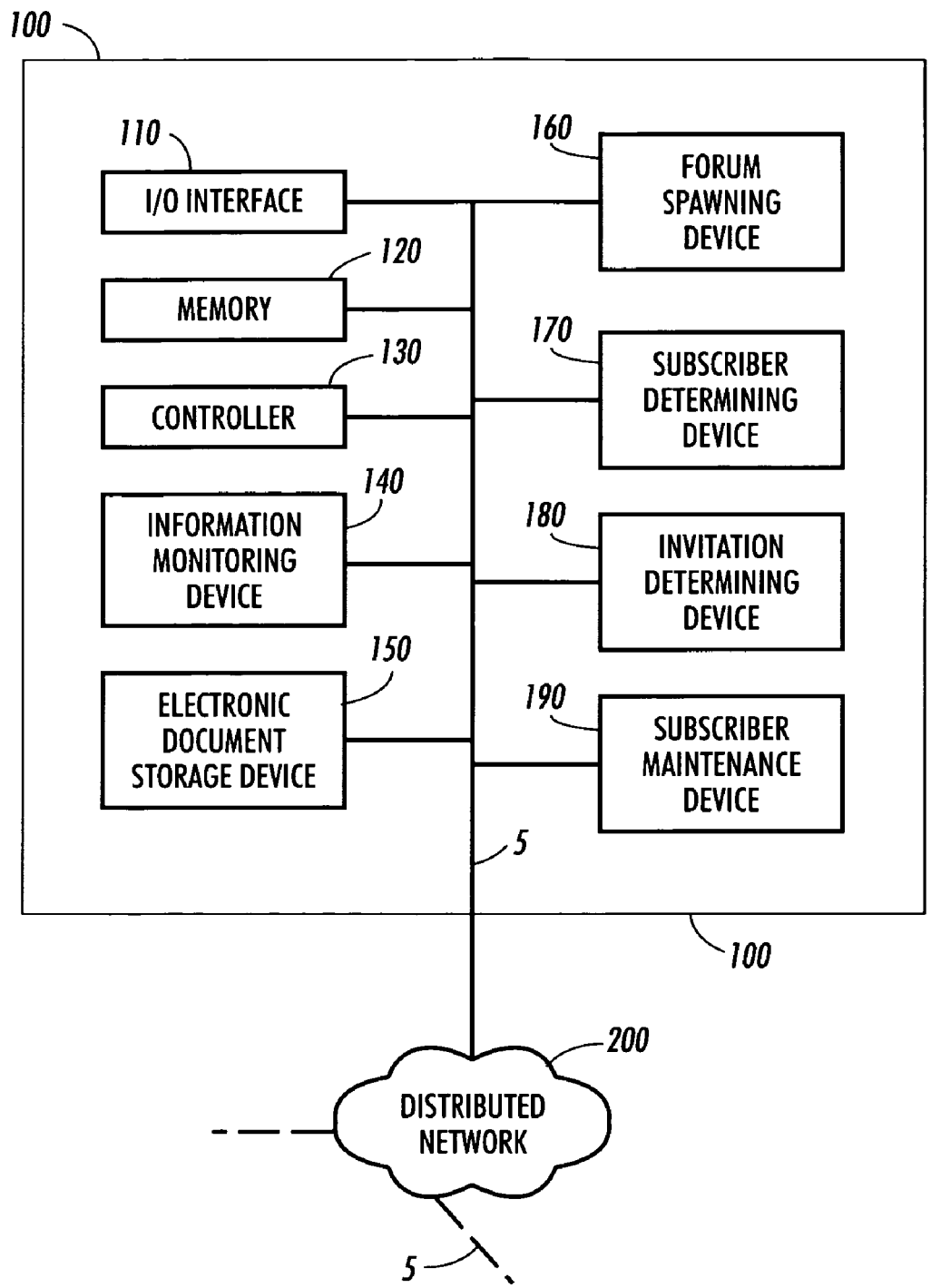
FIG. 1 is a functional block diagram illustrating the exemplary forum monitoring device according to this invention.

FIG. 1 illustrates an exemplary embodiment of a forum monitoring device 100 according to en exemplary embodiment of the present invention. The forum monitoring device 100 comprises an I/O interface 110, memory 120, a controller 130, an information monitoring device 140, an electronic document storage device 150, a forum spawning device 160, a subscriber determining device 170, an invitation determining device 180 and a subscriber maintenance device 190, all interconnected by link 5. The forum monitoring device 100 is connected to at least one distributed network 200 which is connected to one or more information streams and/or other distributed networks.

While the exemplary embodiment illustrated in FIG. 1 shows the forum monitoring device and associated components collocated, it is to be appreciated that the various components of the forum monitoring device 100 can be located at distant portions of a distributed network, such as a local area network, a wide area network, an intranet and/or the interne, or within a dedicated forum monitoring system. Thus, it should be appreciated that the components of the forum monitoring device 100 can be combined into one device or collocated on a particular node of a distributed network. As will be appreciated from the following description, and for reasons of computational efficiency, the components of the forum monitoring device 100 can be arranged at any location, such as a general purpose computer, within a distributed network without affecting the operation of the system.

Furthermore, the links 5 can be a wired or a wireless link or any other known or later developed element(s) that is capable of supplying electronic data to and from the connected elements.

In operation, an information stream is received via the distributed network 200 and the links 5. The information stream can include, for example, electronic messages, e-mail messages, postings to a discussion forum, such as bulletin board service, or the like. In general, an information stream can be comprised of any type of electronic documents. The information stream is received via the I/O interface 110, and with the cooperation of the memory 120 and controller 130 monitored by the information monitoring device 140.

The information monitoring device 140 monitors the information stream an compares information about a portion of the information stream to a set of rules, such as a threshold. For example, the information about the portion of the information stream can include how long the current discussion forum has been in use, how many messages have been exchanged on the forum, whether there has been a suggestion to create a new discussion forum, whether a certain number of messages on a particular topic have been received within a predetermined time period, whether the rate of messages exchanged on a particular topic has been statistically greater than normal, whether a certain number of forum members have exchanged messages on a particular topic within a predetermined time period, or the like. In general, the rules which trigger the information monitoring device 140 to perform an additional task can be established based on the particular environment and/or forum the forum monitoring device 100 is monitoring. Therefore, for example, the forum monitoring device 100 can have a plurality of sets of rules, wherein different sets of rules apply to specific monitored fora. Alternatively, the information monitoring device 140 can also apply the same set of rules to one or more monitored information streams or fora.

Thus, the forum monitoring device 100 is subscribed to or otherwise associated with one or more fora. For example, the forum monitoring device can be assigned an e-mail address. Then, using this e-mail address, the forum monitoring device 100 is added as a subscriber to one or more fora. As electronic documents are added to the subscribed forum, these documents are delivered to the forum monitoring device 100 via the e-mail address. As an information stream from the one or more subscribed fora is received by the forum monitoring device 100, the information monitoring device 140 monitors the information stream in order to determine opportunities for creating a new discussion forum. Upon satisfaction or of one or more rules, such as satisfying a threshold, a new forum is suggested.

In particular, the thresholds may be established such that, for example, the current discussion forum has been in use for x days and/or y messages have been exchanged within the forum. Alternatively, the rules can be established to suggest a new forum when there has not been a suggestion to create a new discussion forum for the current topic and there have been a threshold number of messages posted on the topic within a predetermined time. Alternatively, the suggestion to create a new forum can be triggered if there has been a suggestion to create a new discussion forum for the current topic and there has been a predetermined number of messages posted on the topic within a predetermined time period or any predetermined number of messages since the last suggestion was made. In general, the rules governing triggering of a suggestion to create a new forum can be configured based on the particular environment, information streams and/or fora being monitored.

Upon the satisfaction of one or more rules, the invitation determining device 180, with the cooperation of the subscriber determining device 170; determines a name for the new forum, for example, based on the subject lines of the message as exchanged on the trigger of topic, or based on any other characteristics of the trigger topic. The invitation determining device 180 then sends a suggestion message to all subscribes who posted messages about that topic asking if the subscribers would like to create a new discussion forum for that topic. In particular, the subscriber determining device 170 determines from the information stream all users who participated or posted messages about the particular trigger topic within the forum.

The invitation determining device 180 forwards to the identified subscribers a notification message suggesting creation of a new discussion forum for the identified topic. The invitation determining device 180 monitors responses from the identified subscribers to determine if one or more new forum(s) should be created. For example, the responses could indicate that two additional fora are appropriate. In this exemplary scenario, two new fora would be created.

Upon receiving an indication from any of the identified subscribers to whom a notification message was sent that a new forum should be created, a new forum is created with the aid of the forum spawning device 160. However, it should be appreciated that while in this particular exemplary embodiment only one reply to the notification message is required to trigger creation of a new forum, additional rules can be established which may, for example, require that a predetermined number of subscribers request creation of a new forum before a new forum is created.

Upon receiving the request for a new forum, the forum spawning device 160 creates a new forum. This new forum can be named based on the name determined by the invitation determining device 180 or be amended, for example, based on one or more subscribers' desires. Once the forum has been created and named, the subscriber maintenance device 190 automatically adds the subscribers identified by the subscriber determining device 170 to the new forum. Additionally, the subscriber maintenance device 190 can optionally also notify all or a portion of the parent discussion forum, plus any other recipients of messages posted on the trigger topic, that a new forum has been created and that the other members are welcome to subscribe.

The electronic document storage device 150 allows forum members to remain current with transactions within a forum. Specifically, the discussions within a forum can be automatically archived so that members and/or non-members may periodically review the new discussion. For example, if a user decides to join a forum, the user can automatically retrieve, with the cooperation of the electronic document storage device 150, and the cooperation of the I/O interface 110, the memory 120 and the controller 130, a digest type message containing all or a portion of the recent messages posted within the forum. Alternatively, periodic reports can be sent, with the aid of the electronic document storage device 150 and the subscriber maintenance device 190 to another discussion forum to indicate activity within the forum that have been spawned from, for example, the parent discussion forum. These reports can be generated and reported at predetermined time intervals, or, for example, when traffic in a subforum has reached a threshold, or the like.

Figure 2:
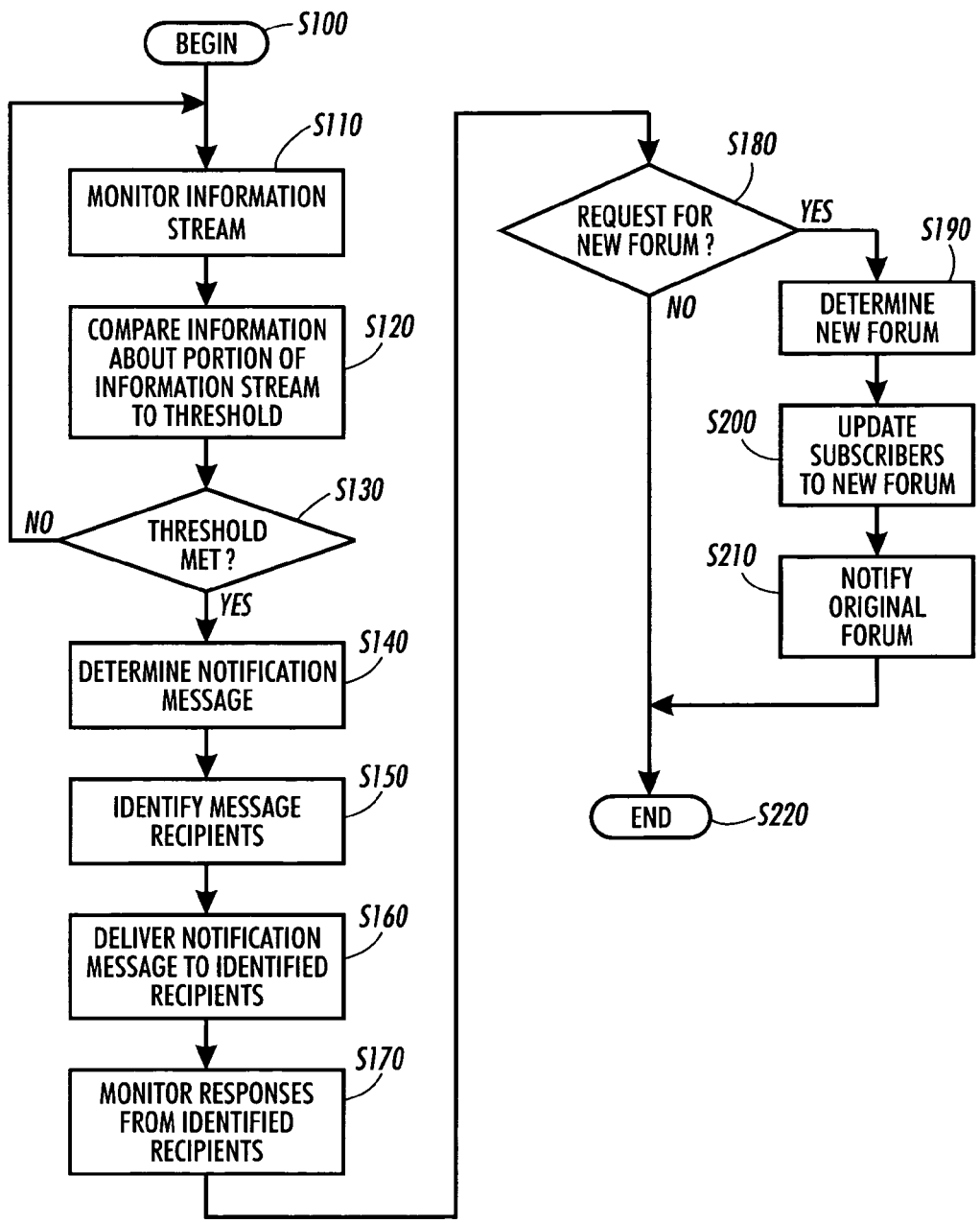
FIG. 2 is a flowchart outlining an exemplary method for monitoring an information stream according to this invention.

FIG. 2 is a flowchart outlining one exemplary embodiment of a method for monitoring an information stream, such as a forum, according to the invention. In particular, control begins at S100 and continues to S110. In S110, an information stream is monitored. Next, in S120, information about a portion of the information stream is compared to a set of rules, such as satisfying one or more thresholds, Boolean comparisons, or the like. This comparison can be a rule-based comparison, statistical model-based comparison, or the like. Then, in S130, a determination is made as to whether one or more of the rules has been satisfied. If one or more of the rules have been satisfied, control continues to S140. Otherwise, control jumps back to S110.

In S140, a notification message is determined. Next, in S150, the message recipients are identified based on, for example, participation within the monitored information stream. Then, in S160, the notification message is delivered to the identified message recipients. Control then continues to S170.

In S170, the responses from the identified recipients are monitored. Next, in S180, a decision is made whether the responses from the identified recipients request a new forum be created. If a new forum request is received, control continues to S190. Otherwise, control jumps to S220.

In S190, a new forum is created whose name is, for example, based on the subject lines of the messages exchanged or some other characteristic of the trigger topic. Next, in S200, the subscribers to the new forum are updated by including those subscribers identified as contributing to the identified topic. Then, in S210, the parent forum is optionally notified that a new discussion forum has been created for the identified topic. Control then continues to S220 where the control sequence ends.

As illustrated in FIG. 1, the forum monitoring device can be implemented either on a single program general purpose computer, or a separate program general purpose computer. However, the forum monitoring device can also be implemented on a special purpose computer, a programmed microprocessor or microcontroller and peripheral integrated circuit element, an ASIC or other integrated circuit, a digital signal processor, a hardwired electronic or logic circuit such as a discrete element circuit, a programmable logic device, such as a PLD, PLA, FPGA, PAL, or the like. In general, any device, capable of implementing a finite state machine that is in turn capable of implementing the flowchart illustrated in FIG. 2 can be used to implement the forum monitoring device according to this invention.

Furthermore, the disclosed method may be readily implemented in software using object or object-oriented software development environments that provide portable source code that can be used on a variety of computer or workstation hardware platforms. Alternatively, the disclosed forum monitoring system may be implemented partially or fully in hardware using standard logic circuits or VLSI design. Whether the software or hardware is used to implement the systems in accordance with this invention is depended on the speed and/or efficiency requirements of the system, the particular function, and the particular software or hardware systems or microprocessor or microcomputer systems being utilized. The forum monitoring systems and methods illustrated herein, however, can be readily implemented in hardware and/or software using any known or later-developed systems or structures, devices and/or software by those of ordinary skill in the applicable art from the functional description provided herein and a general basic knowledge of the computer arts.

Moreover, the disclosed methods may be readily implemented as software executed on a programmed general purpose computer, a special purpose computer, a microprocessor, or the like. In these instances, the methods and systems of this invention can be implemented as a program running on a personal computer, such as a Java® or CGI script, as a resource residing on a server or graphics workstation, as a routine embedded in a dedicated forum monitoring system, a web browser, an electronic message enhanced cellular telephone, a PDA, a dedicated forum monitoring device, or the like. The forum monitoring system can also be implemented by physically incorporated the system and method into a software and/or hardware system, such as the hardware and software systems of a graphic workstation or dedicated forum monitoring device.

For example, the systems and methods of this invention have in embodiments been used to work with the internal discussion lists solely within the workplace of the inventors. In particular, the exemplary agent has been assigned an e-mail account. A distributed network interface allows users to ask the exemplary agent to monitor, or to stop monitoring, the internal discussion lists. In response to such a request, the exemplary agent subscribes, or unsubscribes to the specified lists using a programmatic interface to the internal discussion lists. Once the exemplary agent is a member of the list, the exemplary agent monitors the list traffic. The exemplary agent then judges messages to be on the same topic both by checking for in-reply-to message identifications and by looking for matching subject lines. If all parameter values are satisfied, the exemplary agent will generate a unique name for a new discussion list, based on the subject lines of the topic messages. The exemplary agent will then send a suggestion message to everyone who posted a message on the current topic. Users can agree to this suggestion by responding to the suggestion message. Users may also include a line in the message that requests that the forum be created with a different name than the name determined by the exemplary agent. Once the exemplary agent receives a suggestion acceptance message, the exemplary agent creates a new discussion list, or forum. The exemplary agent then automatically subscribes itself to the list. The exemplary agent also sets up a distributed network accessible message archive using, for example, a bulletin board or digest archiving service. The exemplary agent seeds the archive with the trigger messages that caused the forum to be created. Finally, the exemplary agent automatically subscribes all of the topic contributors to the list, or new forum, and then sends an invitation message to the whole list and to any other recipients of the topic messages. Invitees may join the list simply by responding to the invitation message. New members can automatically receive any postings that were sent to the new forum, before they joined. Members who do not join the list can still be kept informed about list activity through reports. For example, at a predetermined interval, the exemplary agent sends a message to each monitored discussion list with information about activity, for example, including high frequency keywords, number of messages exchanged, number of users, or the like, on discussion lists spawned by the monitored list. Additionally, whenever there is a high activity during a predetermined time on a spawned discussion list, the parent list can be notified.

For the current exemplary agent, the parameters, or thresholds to trigger requesting of a new forum were set as follows: seven days was chosen as the number of days a forum must have existed before a new forum can be suggested. One day was chosen as a number of days that must have elapsed since a new forum was suggested for a particular topic. Seven days was used as a window within which messages must have been exchanged in order to be counted. Three was chosen as the number of messages on a topic that must be exchanged for a suggestion to be made if no suggestion has been previously made. And finally, 10 was chosen as the number of messages on a topic that must be exchanged for a suggestion to be made if a suggestion has been made previously.

However, it should appreciated that the above-identified parameters can be altered depending on the particular environment, forum, number of users, or the like within which the forum monitoring system is implemented.

It is, therefore, apparent that there has been provided, in accordance with the present invention, a system and method for monitoring a forum. While this invention has been described in conjunction with a number of embodiments thereof, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. An information stream monitoring system comprising:
an information monitoring device adapted to monitor one or more electronic email documents in an information stream associated with a first electronic forum, and to compare information about the one or more electronic email documents to two or more rules, wherein the comparison is between newer of the one or more email documents and older of the one or more email documents to determine when a new topic of conversation has begun;
a forum spawning device adapted to query a set consisting of users participating in the first forum when at least two of the two or more rules are satisfied, and to create a new electronic forum based on one or more replies from the set of users; and
a subscriber determining device adapted to determine which of the queried users indicate interest in the new electronic forum and to subscribe each interested user to the new electronic forum, but not to subscribe users of the set who do not indicate interest in the new electronic forum,
wherein the two or more rules comprise at least two of the following: how long the electronic forum has been in use; how many email messages have been exchanged on the electronic forum; whether there has been a suggestion to create a new discussion forum; whether a certain number of email messages on a particular topic have been received within a predetermined time period; whether a rate of email messages exchanged on a particular topic is statistically greater than normal; or whether a certain number of forum members exchanged email messages on a particular topic within a predetermined time period,
further wherein the information monitoring device, the forum spawning device, and the subscriber determining device are executed by a processor.

2. The system of claim 1, wherein the forum spawning device queries the set of users to determine a need for the new electronic forum.

3. The system of claim 1, further comprising:
a subscriber maintenance device adapted to associate the new electronic forum and the set of users indicating interest in the new electronic forum.

4. The system of claim 1, further comprising:
an electronic document storage device adapted to store the one or more electronic email documents.

5. The system of claim 1, wherein the information comparison is based on a rule-based model and a statistical-based model.

6. The system of claim 1, wherein the information stream comprises one or more email messages flowing between two or more of the set of users.

7. The system of claim 1, wherein the information monitoring device detects whether the new topic of conversation is likely to generate additional email messages.

8. The system of claim 1, wherein the subscribers to the new electronic forum receive email messages from both the first electronic forum and the new electronic forum.

9. An information stream monitoring method comprising:
monitoring one or more email documents in an information stream associated with a first forum;
comparing information about the one or more email documents to two or more rules, wherein the comparing is comparing newer of the one or more email documents to older of the one or more email documents to determine when a new topic of conversation has begun;
querying a set consisting of users participating in the first electronic forum when at least two of the two or more rules are satisfied;
creating a new electronic forum automatically based on one or more replies from the set of users, and
subscribing each queried user of the set indicating interest in the new electronic forum to the new electronic forum, but not subscribing to the new electronic forum users of the set who do not indicate interest,
wherein the two or more rules comprise at least two of the following: how long the electronic forum has been in use; how many email messages have been exchanged on the electronic forum; whether there has been a suggestion to create a new discussion forum; whether a certain number of email messages on a particular topic have been received within a predetermined time period; whether a rate of email messages exchanged on a particular topic is statistically greater than normal; or whether a certain number of forum members exchanged email messages on a particular topic within a predetermined time period.

10. The method of claim 9, wherein querying the set of users determines a need for the new electronic forum.

11. The method of claim 9, further comprising:
associating the new electronic forum and the set of subscribers.

12. The method of claim 9, further comprising:
storing the one or more email documents.

13. The method of claim 9, wherein the information comparison is based on a rule-based model and a statistical-based model.

14. The method of claim 9, wherein the information stream comprises one or more email messages flowing between two or more of the set of users.

15. The method of claim 9, further comprising:
detecting whether the new topic of conversation is likely to generate additional email messages.

16. The method of claim 9, wherein the subscribers to the new electronic forum receive email messages from both the first electronic forum and the new electronic forum.

17. A non-transitory computer-readable storage media comprising information that, when executed by a computer, cause the computer to perform a method comprising:
monitoring one or more email documents in an information stream associated with a first electronic forum;
comparing information about the one or more email documents to two or more rules, wherein the comparison is between newer of the one or more email documents and older of the one or more email documents to determine when a new topic of conversation has begun;
querying a set consisting of users participating in the first electronic forum when at least two of the two or more rules are satisfied;
creating a new electronic forum based on one or more replies from the set of users; and
subscribing each queried user of the set indicating interest in the new electronic forum to the new electronic forum, but not subscribing to the new electronic forum users of the set who do not indicate interest,
wherein the two or more rules comprise at least two of the following: how long the electronic forum has been in use; how many email messages have been exchanged on the electronic forum; whether there has been a suggestion to create a new discussion forum; whether a certain number of email messages on a particular topic have been received within a predetermined time period; whether a rate of email messages exchanged on a particular topic is statistically greater than normal; or whether a certain number of forum members exchanged email messages on a particular topic within a predetermined time period.

18. The non-transitory computer-readable storage media of claim 17, wherein querying the set of users determines a need for the new electronic forum.

19. The non-transitory computer-readable storage media of claim 17, further comprising:
associating the new electronic forum and at least one of the set of users.

20. The non-transitory computer-readable storage media of claim 17, further comprising:
storing the one or more email documents.

21. The non-transitory computer-readable storage media of claim 17, wherein the information comparison is based on a rule-based model and a statistical-based model.

22. The non-transitory computer-readable storage media of claim 17, wherein the information comparison compares at least one of: subject information; email document posting information; and email document tracking information.

23. The non-transitory computer-readable storage media of claim 17, wherein the information stream comprises one or more email messages flowing between two or more of the set of users.

24. The non-transitory computer-readable storage media of claim 17, further comprising:
detecting whether the new topic of conversation is likely to generate additional email messages.

25. The non-transitory computer-readable storage media of claim 17, wherein the subscribers to the new electronic forum receive email messages from both the first electronic forum and the new electronic forum.

\* \* \* \* \*